Patented Nov. 7, 1939

2,178,695

UNITED STATES PATENT OFFICE 2,178,695

METHOD OF STABILIZING HALOGENATED HYDROCARBONS

Irving E. Muskat, Akron, and Lynn King, Barberton, Ohio, assignors to Pittsburgh Plate Glass Company, Allegheny County, Pa., a corporation of Pennsylvania No Drawing. Application February 3, 1938, Serial No. 188,575

11 Claims. (Cl. 260—652)

This invention relates to the stabilization of halogenated hydrocarbons and is particularly related to the stabilization of chlorinated petroleum hydrocarbons by treatment with sulphuric acid.

It has long been a matter of common practice to chlorinate or halogenate various hydrocarbons to produce products suitable for use in transformer oils, cutting oils, lubricants, solvents, plasticizers, etc. Upon chlorination of many aliphatic hydrocarbons, however, it has often been found that the chlorinated products are very unstable and that under the action of heat, light, etc., these compounds tend to break down, losing a portion of the chlorine therein with the resultant formation of hydrogen chloride. The evolution of hydrogen chloride from these compounds often has been so great as to make the compounds extremely corrosive and therefore practically worthless for many uses.

In accordance with our invention, we have found that certain hydrocarbons may be stabilized to a high degree by treatment with concentrated sulphuric acid. These compounds, after such treatment, may be subjected to high pressures and prolonged heating without substantial loss of chlorine.

The process is particularly adapted to stabilization of chlorinated petroleum hydrocarbons such as chlorinated gasoline or naphtha, chlorinated kerosene or other chlorinated petroleum distillation residues. When products of this type are treated with sulphuric acid in accordance with my invention, they are highly resistant to thermal decomposition. Other unstable chlorinated hydrocarbons may be stabilized by this treatment to a somewhat lesser degree. It is found that saturated aliphatic hydrocarbons, such as normal amyl chloride, propylene dichloride, chlorinated rubber, etc., upon subjection to a mild treatment with sulphuric acid, have higher heat stabilities than the untreated materials. Certain unsaturated hydrocarbons may also stabilize to some degree but in general, the treatment of unsaturated compounds may be complicated by the formation of undesirable polymers or addition products.

The treatment may be carried out in a convenient manner which will insure good contact between the hydrocarbon and the sulphuric acid. We have found that stabilization may be satisfactorily secured by heating a mixture of sulphuric acid and the chlorinated hydrocarbon under such conditions that intimate intermingling of the constituents is obtained. It is preferred that the sulphuric acid be concentrated. Very efficient results appear to be obtained by treatment with 96% sulphuric acid but other concentrations as low as 80% have been used with some success. While occasionally, some stabilization may be secured by treatment with sulphuric acid of 50% concentration, in general, the degree of stabilization obtained thereby is not sufficient for most purposes.

After treatment with sulphuric acid, the liquid mixture may be allowed to settle. A sulphuric acid phase, often containing dissolved reaction products and/or a small quantity of black sludge or oil, is found to separate from the treated hydrocarbon and may be withdrawn. If desired, the remaining treated hydrocarbon may be diluted with suitable solvents such as ether to avoid the formation of emulsions and subsequently washed with an alkaline solution as, for example, a 5% solution of sodium hydroxide saturated with NaCl to remove other water soluble impurities. The excess alkali may then be removed by washing with suitable aqueous liquors such as saturated NaCl and the hydrocarbon dried in a suitable manner as, for example, by treatment with a convenient dehydrating agent such as sodium sulphate. The treated and dried product is found to be a very stable material containing substantially no sulphuric acid derivatives. The treatment appears to remove unstable materials or materials present in the compound which promote instability, but does not appear to attack the compound itself to any extensive degree. However, the sulphuric acid apparently attacks the less stable material present in the compound or composition with evolution of some HCl. This material is then removed with the sulphuric acid, generally as an emulsion or tar. For this reason, the composition of the material being treated, in general, remains substantially unchanged although at times the chlorine content thereof may be increased. No substantial loss of chlorine is observed after subjection of the treated material to high temperatures for many hours.

The sulphuric acid phase obtained from this treatment is, in general, highly concentrated. It may be used for stabilization of further quantities of chlorinated hydrocarbons or may be used as a pickling solution in metal pickling processes.

The following examples illustrate the invention:

*Example I.*—A substantial portion of a highly cracked gasoline was treated with chlorine at a temperature of 30° C. until the chlorine content of the product was approximately 43% and the material was substantially free from unsaturated compounds. This product was very unstable and decomposed readily upon heating to 100° C. with water. It boiled over a range of 40–210° C. at a pressure of 30 m. m.

One part by weight of this chlorinated gasoline was mixed with 1.76 parts of 96% sulphuric acid and the mixture heated to a temperature of 60° C. for 5 hours and allowed to stand for one-half hour. A sulphuric acid phase containing a small amount of black oil separated and was removed. The remaining oil was diluted with ether and the ether solution washed with saturated NaCl and then the 5% NaOH solution. The washed solution was then treated to remove excess alkali by further washings with NaCl, dried over sodium sulphate, and the ether removed by distillation. This treatment resulted in a 50% yield of a brown oil which contained approximately 45% chlorine, did not noticeably decompose upon subjection to prolonged heating at 100° C. for several hours and which was otherwise very stable. The boiling point of this material was substantially the same as that of the unchlorinated material.

*Example II.*—One part of the chlorinated gasoline referred to in Example I was mixed with 1.38 parts of 80% sulphuric acid and treated according to the procedure outline in Example I and a 60% yield of a fairly stable product containing approximately 44% chlorine was obtained.

*Example III.*—One part of "Tornesit", which is a highly chlorinated rubber product, was mixed with 1.76 parts of 96% sulphuric acid and heated at 40° C. for two hours. The treated product, obtained in high yield, was more stable than the original material.

*Example IV.*—One volume of 96% sulphuric acid (expressed in cc.) was mixed with 10 parts by weight (expressed in grams) of commercial propylene dichloride and heated for 2½ hours at 40° C. and the treated product recovered, as in Example I, a 98% yield of propylene dichloride was obtained. This product was much more stable than the untreated material.

The quantity of concentrated acid used is capable of some variation. In general, one part by weight (expressed in grams) of the chlorinated compound may be treated with one volume (expressed in cc.) of sulphuric acid, but stable products have been obtained by treatment of four parts by weight of the chlorinated hydrocarbon to one volume of sulphuric acid. Treatment of as much as 10 parts by weight of the chlorinated hydrocarbon to one volume of concentrated sulphuric acid may, in some cases, result in the production of satisfactorily stable products.

The temperature of treatment may be varied to a considerable degree, being largely dependent upon the volatility of the material being treated and its tendency to polymerize or decompose under action of heat. Temperatures from 40–100° C. have been found suitable, but other temperature may be used and in some cases heating may be dispensed with. Time of treatment will depend upon the nature of the material being treated, but should be sufficiently long to insure substantial stability. At the same time, the temperature and time of treatment are preferably so regulated that substantial decomposition or conversion of the material is avoided. In general, treatment for 2–5 hours has been considered sufficient. Compounds of varying chlorine content have been treated by this process, however, it is preferred in the treatment of petroleum naphtha or gasoline to use compounds containing less than substantially 50% chlorine. Chlorinated petroleum hydrocarbons containing chlorine in excess of this concentration may be successfully stabilized, but the tendency to form undesirable sludges and sulphuric acid reaction products appears to be increased with increasing concentrations of chlorine.

While the stabilization treatment has been described for the most part, with reference to chlorine compounds other halogenated products such as bromine compounds may be treated with sulphuric acid to increase their stability.

Chlorinated petroleum fractions treated in this manner may be used in extreme pressure lubricants, cutting oils, and as transformer oils. Thus, these materials, when used alone or when blended with other insulating oils, are found to have very desirable dielectric properties. Similarly, the stabilized chlorinated petroleum hydrocarbons, such as chlorinated naphtha or gasoline or chlorinated kerosene, may be mixed with other lubricating oils in concentrations up to 25 per cent to yield products having very desirable lubricating qualities which are very resistant to extreme heat and pressure. Other uses will occur to those skilled in the art.

Although the invention has been described in connection with the specific details of certain embodiments thereof, it is not intended that such details shall be considered as limiting the scope of the invention except insofar as included in the accompanying claims.

We claim:

1. A method of stabilizing a normally unstable substantially saturated aliphatic hydrocarbon containing substantial quantities of chlorine which comprises contacting said hydrocarbon with concentrated sulphuric acid in sufficient concentration and for a time sufficient to stabilize said hydrocarbon but insufficient to cause decomposition of the major portion thereof.

2. A method of stabilizing normally unstable chlorinated petroleum fractions which comprises contacting said hydrocarbon with concentrated sulphuric acid.

3. A method of stabilizing chlorinated naphtha which comprises contacting said naphtha with concentrated sulphuric acid.

4. A method of stabilization which comprises contacting a normally unstable chlorinated substantially saturated aliphatic hydrocarbon with concentrated sulphuric acid, in sufficient concentration and for a time sufficient to stabilize said hydrocarbon but insufficient to cause decomposition of a major portion thereof, separating the sulphuric acid together with any reaction products which may be dissolved therein from the treated hydrocarbon and using said sulphuric acid to treat further quantities of said hydrocarbon.

5. A method of stabilization which comprises contacting a normally unstable chlorinated naphtha with concentrated sulphuric acid, separating the sulphuric acid from the treated naphtha and using said sulphuric acid to treat further quantities of said naphtha.

6. The process of claim 3 wherein the chlorine content of said naphtha does not substantially exceed 50%.

7. A method of stabilizing normally unstable substantially saturated aliphatic hydrocarbons containing substantial quantities of halogen which comprises contacting hydrocarbons with concentrated sulphuric acid in sufficient amounts and for a time sufficient to stabilize said hydrocarbons but insufficient to cause decomposition of a major portion of said hydrocarbons.

8. A method of stabilizing halogenated naphtha which comprises contacting said naphtha with concentrated sulphuric acid.

9. A method of stabilizing a normally unstable substantially saturated aliphatic hydrocarbon containing substantial quantities of halogen which comprises heating said hydrocarbon in contact with concentrated sulphuric acid in sufficient concentration and for a time sufficient to stabilize said hydrocarbon but insufficient to cause decomposition of the major portion thereof.

10. A method of stabilizing normally unstable halogenated petroleum fractions which comprises contacting said hydrocarbon with concentrated sulphuric acid.

11. A method of stabilizing halogenated naphtha which comprises contacting said naphtha with concentrated sulphuric acid for a time sufficient to stabilize said naphtha but insufficient to cause decomposition of a major portion of the halogenated naphtha.

IRVING E. MUSKAT.
LYNN KING.